Oct. 23, 1923.
S. MIERZWINSKI
1,471,747
CANOE PROPELLING DEVICE
Filed Jan. 21, 1921
2 Sheets-Sheet 1
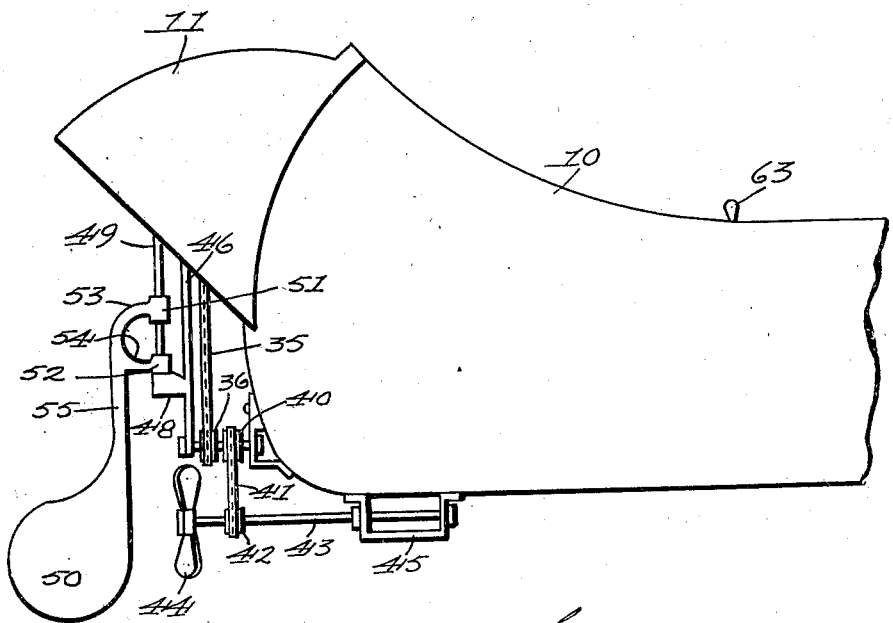
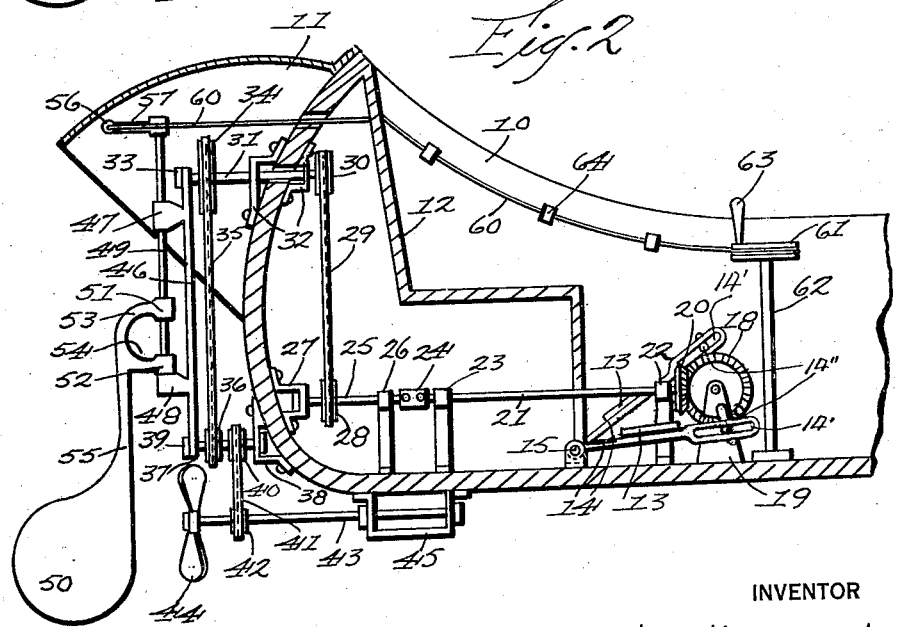
INVENTOR
Stanislaw Mierzwinski
BY his ATTORNEY Oct. 23, 1923.

S. MIERZWINSKI 1,471,747

CANOE PROPELLING DEVICE

Filed Jan. 21, 1921

INVENTOR
Stanislaw
Mierzwinski

BY ⁄⁄⁄ ATTORNEY

George C. Heinrich

Patented Oct. 23, 1923.

1,471,747

UNITED STATES PATENT OFFICE.

STANISLAW MIERZWINSKI, OF TRENTON, NEW JERSEY.

CANOE-PROPELLING DEVICE.

Application filed January 21, 1921. Serial No. 438,845.

*To all whom it may concern:*

Be it known that I, STANISLAW MIERZ-WINSKI, a citizen of Poland, residing at Trenton, county of Mercer, and State of New Jersey, have invented certain new and useful Improvements in Canoe-Propelling Devices, of which the following is a specification.

The present invention relates to improvements in boat propelling devices, particularly to devices for propelling canoes or the like.

It is the principal object of the invention to provide a device of this character adapted to propel a canoe by foot power as well as by motor.

A further object of the invention is to provide a device of the type in question, which permits of steering the canoe by the operator while propelling the same with his feet.

These and other objects and advantages of the invention will become apparent as the description proceeds, reference being had to the accompanying drawings in which—

Figure 1 is a side view of the rear part of a canoe equipped with a device constructed according to the present invention.

Figure 2 is a similar view, partly in section to illustrate the interior arrangement.

Figure 3 is a top plan view of the rear part of a canoe, and

Figure 4 shows a shaft coupling.

The rear part of a canoe 10 is equipped with a spray hood 11 and a seat 12 for the operator. In front of this seat the foot pedals 13 are arranged on rods 14, the rear ends of which are pivotally secured as at 15 to a cross bar, while their extended front ends are slotted as at 14' (Figs. 2 and 3) for the reception of pins 14'' fastened to crank arms 16, 17 operating at their meeting ends, a bevel gear 18 on a standard 19.

This bevel gear 18 is in mesh with another bevel gear 20 on a shaft 21, the front end of which is journaled in a bracket 22 while its rear end is journaled in a post 23 and extended beyond the same and is coupled by means of a coupling 24 to the front end of an operating shaft 25 journaled in a standard 26, the rear end of which is journaled in a bracket 27 secured to the rear wall of the canoe. Between the standard 26 and the bracket 27 the shaft 25 carries a sprocket wheel 28 over which a chain 29 is guided which is also guided over a sprocket wheel 30 on a shaft 31 extended through the rear wall of the canoe, and journaled in bracket 32. At its outer end the shaft 31 carries a head 33 and between said head and the bracket 32 the shaft 31 carries a sprocket wheel 34 over which a chain 35 is running, the latter being also guided over a sprocket wheel 36 on a shaft 37. The shaft is journaled at its inner end in a bracket 38 secured to the outer rear wall of the canoe, while the outer end of said shaft carries a head 39. In rear of the sprocket wheel 36 the shaft 37 carries another sprocket wheel 40, over which a chain 41 is passed which is also guided over a sprocket wheel 42 on the propeller shaft 43 carrying at its outer end the propeller 44, while its inner end is journaled in a bracket 45 secured to the bottom part of the canoe.

Near the heads 33 and 39 of the shaft 31 and 37 respectively a bar 46 is attached to these shafts provided intermediate its ends with guides 47, 48 for the steering post 49 to which the rudder 50 is rotatably secured by means of sockets 51 and 52 on the ends of arms 53 and 54 of the rudder shaft 55.

At its upper end the steering post 49 carries secured thereto as at 56 the tiller arms 57, to the free ends of which the cords 59 and 60 are secured, the free ends of which are wound around a horizontal pulley 61 on a vertical shaft 62 secured to the bottom of the canoe. The disc or pulley 61 carries on its upper face a handle 63, and intermediate its ends the cord 60 carries blocks 64 or the like, affording a firm grip on line 60 when the steering is to be effected by hand without the assistance of the pulley 61.

The coupling 24 is a simple sleeve 65 which is secured to the adjoining ends of the two shafts by means of screws 66.

When it is desired to drive the canoe by a motor of any desired type the coupling sleeve is removed from the shaft 21 and is attached to the driving shaft of the motor.

The operation of my device will be clear from the above description and by reference to the drawings without further explanation.

Having thus described my invention, what I claim as new and desire to secure by Letters Patent of the United States is—

A boat propelling device of the class described comprising a standard in front of a boat seat, a bevel gear journaled to said standard, a pair of crank arms secured to the side faces of said bevel gear, rods secured with their front ends to said cranks, a cross bar connecting the rear ends of said rods, pedals on said rods intermediate the ends thereof, a bevel gear in mesh with said first named bevel gear, a bi-partite horizontal shaft for said second bevel gear, a coupling for both parts of said shaft, another horizontal shaft above said first named horizontal shaft extending out of the boat's stern, sprocket wheels on both horizontal shafts, a chain connecting said sprocket wheels, a short horizontal shaft journaled at the outer side of the boat below said extended shaft, sprocket wheels on said extended shaft and the last named horizontal shaft, a chain guided over said sprocket wheels, a horizontal shaft journaled in a bracket secured to the outer face of the boat's bottom, a propeller at the extreme outer end of said last named horizontal shaft, sprocket wheels on said last named short shaft and the propeller shaft $a$, a chain guided over said sprocket wheels.

In testimony whereof I have affixed my signature.

STANISLAW MIERZWINSKI.